United States Patent
Kammerer (10) Patent No.: US 11,986,894 B2
(45) Date of Patent: May 21, 2024

(54) ROPE SAW

(71) Applicant: Kammerer GmbH, Remchingen (DE)

(72) Inventor: Rolf Kammerer, Remchingen (DE)

(73) Assignee: Kammerer GmbH, Remchingen (DE)

( * ) Notice: Subject to any disclaimer, the term of this patent is extended or adjusted under 35 U.S.C. 154(b) by 0 days.

(21) Appl. No.: 17/662,428

(22) Filed: May 7, 2022

(65) Prior Publication Data
US 2022/0258259 A1    Aug. 18, 2022

Related U.S. Application Data (63) Continuation of application No. PCT/EP2020/079362, filed on Oct. 19, 2020.

(30) Foreign Application Priority Data

Dec. 4, 2019 (DE) .................. 10 2019 133 055.6

(51) Int. Cl.
*B23D 53/02* (2006.01)
*B23D 55/02* (2006.01)

(52) U.S. Cl.
CPC ............ *B23D 53/02* (2013.01); *B23D 55/02* (2013.01)

(58) Field of Classification Search
CPC ...... B23D 53/02; B23D 53/023; B23D 55/02; B23D 57/0015; B23D 57/0092
USPC .................................................. 83/788, 809
See application file for complete search history.

(56) References Cited

U.S. PATENT DOCUMENTS

| | | | | |
|---|---|---|---|---|
| 2,274,923 A | * | 3/1942 | Hedgpeth | B27B 13/06 83/810 |
| 2,515,345 A | * | 7/1950 | Hayes | B23D 59/04 236/1 C |
| 2,579,955 A | | 12/1951 | Orescan | |
| 2,972,669 A | | 2/1961 | Brown | |
| 3,521,682 A | | 7/1970 | Schinzler, Jr. | |
| 3,913,436 A | * | 10/1975 | Orescan | B26D 1/46 83/788 |
| 4,193,192 A | | 3/1980 | Cortez | |
| 4,269,098 A | * | 5/1981 | Fogle | B23D 55/082 83/733 |
| 4,364,294 A | * | 12/1982 | Eccardt | B23D 53/045 83/454 |
| 4,491,047 A | * | 1/1985 | Butkiewicz | B23D 55/02 83/100 |
| 4,838,968 A | * | 6/1989 | Nelson | B32B 3/30 428/167 |

(Continued)

FOREIGN PATENT DOCUMENTS

| | | |
|---|---|---|
| CH | 120311 A | 7/1927 |
| CN | 103144209 B | 1/2016 |

(Continued)

*Primary Examiner* — Ghassem Alie
(74) *Attorney, Agent, or Firm* — Orbit IP (57) ABSTRACT

A rope saw for cutting panels to size includes an elongate frame, which includes a support for placing panels to be sawn thereon. Two wheels are attached to the frame for mounting a revolving saw rope, between which extends a longitudinal direction of the frame. An electric motor is attached to the frame for driving one of the two wheels. The electric motor includes a motor shaft, which extends in longitudinal direction of the frame and which is coupled via a flexible shaft to one of the two wheels.

15 Claims, 6 Drawing Sheets

(56) References Cited

U.S. PATENT DOCUMENTS

| | | | |
|---|---|---|---|
| 5,201,110 A * | 4/1993 | Bane | B23D 53/02 |
| | | | 83/788 |
| 7,493,842 B2 * | 2/2009 | Feng | B23D 55/06 |
| | | | 83/788 |
| 2006/0144207 A1 | 7/2006 | Nortmann et al. | |
| 2007/0137456 A1 | 6/2007 | Liao | |
| 2008/0289473 A1 * | 11/2008 | Diener | B23D 53/04 |
| | | | 83/799 |
| 2014/0321919 A1 * | 10/2014 | Clark, II | B63B 35/03 |
| | | | 405/156 |

FOREIGN PATENT DOCUMENTS

| | | | |
|---|---|---|---|
| CN | 207914696 U | 9/2018 | |
| DE | 297 03 395 U1 | 5/1997 | |
| DE | 202005017147 U1 * | 2/2006 | B23D 53/001 |
| DE | 10 2005 021 284 A1 | 11/2006 | |

\* cited by examiner

ROPE SAW

CROSS-REFERENCE TO RELATED APPLICATIONS

This continuation application claims priority to PCT/EP2020/079362 filed on Oct. 19, 2020 which has published as WO 2021/110315 A1 and also the German application number 10 2019 133 055.6 filed on Dec. 4, 2019, the entire contents of which are fully incorporated herein with these references.

DESCRIPTION

Field of the Invention

The invention relates to a rope saw for cutting plates to size.

Background of the Invention

DE 10 2005 021 284 A1 discloses a portable rope saw comprising two wheels attached to a frame for tensioning a revolving saw rope. One of these two wheels is driven by a motor, the motor shaft of which is arranged coaxially with a geometric axis of this wheel.

This rope saw is a handheld unit, which can be easily carried along by craftsmen and used for a large variety of jobs. However, this handheld unit makes it difficult to precision-cut larger panels such as plasterboards or thermal insulation panels to size.

SUMMARY OF THE INVENTION

It is an aim of the present invention to propose a rope saw, with which it is possible to precision-cut panels made of insulation material, plaster, stone or ceramics, and which is nevertheless so light and compact that it can be carried along without problems by workmen to various places of use.

This aim is achieved by a rope saw with the characteristics of claim 1. Advantageous refinements of the invention are the subject of dependent claims.

A rope saw according to the invention has an elongate frame with a support attached thereto for placing panels for sawing thereon. A frame with such a support makes it possible to cut panels to size in a more precise fashion than with a freely handheld unit. Because the support is pivotably attached to the frame, panels can be cut to size at different angles.

An advantageous refinement of the invention provides for an electric motor to be attached to the frame of the rope saw, the motor shaft of which extends in longitudinal direction of the frame. The motor shaft is coupled via a flexible shaft to a geometric axis of the wheel driven by it. According to the invention a compact and easily transportable rope saw is thus created.

A saw rope is tensioned between the two wheels of a rope saw according to the invention. Saw ropes made of diamond-studded wire are particularly suitable, for example three to six wire strands, which are studded with diamonds and intertwined or twisted with each other. Suitable saw ropes are for example known from CN 103 144 209 B. For example, a saw rope may be used, which has a diameter of not more than 1.0 mm.

An advantageous refinement of the invention provides for the wheels, between which the saw rope is tensioned, to have a revolving support surface for the saw rope, which is made of plastic, for example polyurethane. By using a circumferential wheel surface made of plastic for supporting the saw rope, a longer service life for the saw rope is achieved compared to support surfaces made of metal. This is due to greater static friction of the saw rope on a plastic surface. Relative movements between saw rope and support surface, which leads to wear, can therefore be reduced. The wheels for mounting the saw rope may be manufactured from metal and then provided with a coating or a plastic ring. Alternatively, the wheels for mounting the saw rope may be manufactured entirely from plastic.

A further advantageous refinement of the invention provides for the two wheels of the rope saw to have a diameter of at least 20 cm, preferably at least 30 cm, especially preferably at least 40 cm. Such large wheels advantageously reduce the bending load of the saw rope and therefore promote a longer service life of the saw rope. Diamond-studded wires are, after all, less flexible than wires which are not studded with diamonds. When bending a diamond-studded wire, this may result in diamonds chipping off or in a break of the wire. A reduced bending load due to relatively large wheels of the rope saw is therefore advantageous. Wheel diameters of more than 60 cm, however, hardly lead to any additional advantages and result in a larger and more unwieldy rope saw, which is disadvantageous for mobile use.

A further advantageous refinement of the invention provides for the support, on which to place panels for sawing, to be a strip, the longitudinal direction of which extends transversely to the longitudinal direction of the frame and thus also transversely to the running direction of a saw rope tensioned between the wheels of the rope saw. With such a rope saw therefore panels for cutting to size are then sawn in an upright position instead of in a lying-flat position as in the case of conventional units. Advantageously a rope saw according to the invention can therefore be manufactured as a compact and portable unit.

In an embodiment of the invention, the support attached to the frame may be collapsible. Advantageously the support can then be retracted, so that the rope saw is easier to transport. For example, the support can be fixed to the frame in different angle positions, so that panels can be cut to size in shapes other than as a rectangle. When the support is fixed to the frame vertically to the longitudinal direction of the frame and thus vertically to the running direction of the saw rope, the cutting line during sawing extends vertically to the edge of the panel, with which it is supported on the support. By adjusting the angle of the support, the angle between the cutting line during sawing and the panel edge supported on the support can also be adjusted accordingly.

In an embodiment of the invention, a supporting wall for guiding a panel standing on the support is attached to the frame of a rope saw according to the invention. This makes the precise cutting-to-size of standing panels very much easier. The supporting wall may be formed by a metal sheet or a panel. The supporting wall may be a grille in order to reduce weight.

A further advantageous refinement of the invention provides for the support to be movable transversely to the longitudinal direction of the frame relative to the wheels, preferably movable together with the supporting wall. In this way a panel on the support can be precisely cut to size. For example, support, supporting wall and electric motor are attached to a bracket, which can be moved by means of a linear guide relative to the wheels transversely to the longitudinal direction of the frame.

The supporting wall may be angle-adjustable, so that panels can be precisely cut with a chamfer or cut to form wedges. If the supporting wall is designed to be angle-adjustable, it may be pivotable about an axis along which the support extends.

A further advantageous refinement of the invention provides for the two wheels to protrude in longitudinal direction of the frame beyond its two ends. Advantageously the saw can thus be manufactured so as to be compact and easily transportable. If the two wheels protrude in longitudinal direction of the frame beyond its two ends, the rope saw cannot be operated vertically. This is however not a disadvantage, because the rope saw can be operated in a tilted position, i.e. in a position, in which the longitudinal direction of the frame extends obliquely to the vertical, for example in that the frame is leant against a wall.

A further advantageous refinement of the invention provides for the frame to include a fold-out foot. This allows the rope saw to be designed as a compact unit and to be operated in a position, in which the longitudinal direction of the frame extends obliquely to the vertical. In addition to a fold-out foot, the rope saw may also include a foot rigidly attached to the frame.

A further advantageous refinement of the invention provides for one of the two wheels to be movable relative to the frame in longitudinal direction of the frame. By moving one of the two wheels relative to the frame, it can be ensured that the saw rope is kept under constant tension, for example in case of a change in the wheel diameter due to wear or temperature-dependent alterations of the saw rope. Due to a spring active between the frame and a wheel movable relative thereto, for example a pressure spring, the force of the spring can be used to predefine tension of the saw rope. The distance between the frame and the wheel movable relative thereto then always adjusts itself in such a way that there is an equilibrium of forces between the spring tension and the amount of tension in the rope.

BRIEF DESCRIPTION OF THE DRAWINGS

Further details and advantages of the invention are explained by way of illustrative embodiments with reference to the attached drawings. Identical and mutually corresponding components are identified therein with matching reference symbols. In the drawings.

DETAILED DESCRIPTION OF THE PREFERRED EMBODIMENTS

The rope saw shown in various views in FIGS. 1 to 4 has an elongate frame 1, which supports two wheels 4, 5 for mounting a saw rope 6. The saw rope 6 is an endless saw rope, which has been produced by connecting, for example gluing, the two ends of a saw rope to each other. At its lower end the frame 1 has a foot 2. As shown in particular in FIG. 2, the lower wheel 4 protrudes beyond the foot 2 of the frame 1. The rope saw cannot therefore be operated in a position, in which the longitudinal direction of the frame 1 is vertical.

The rope saw is intended for operation in a position, in which the longitudinal direction of the frame extends obliquely to the vertical.

For this reason, the rope saw has a further foot 8, which is foldably attached to the frame 1. When the rope saw is standing on its foot 2 rigidly attached to the frame 1 and its foot 8 foldably attached to the frame 1, the longitudinal direction of the frame 1 is oblique to the vertical, so that the lower wheel can turn as well. Alternatively the rope saw can also be used leaning against a wall. To this effect the frame 1 may have a pad 3 at its end facing away from the foot 2 for leaning against a wall.

One of the two wheels 4, 5 — wheel 4 in the embodiment shown — is driven by an electric motor 9 mounted on the frame 1. The electric motor has a motor shaft 21, which extends in longitudinal direction of the frame and is coupled via a flexible shaft 11 to the driven wheel 4. To this end the driven wheel 4 is provided with a gear unit 10, via which the flexible shaft 11 is coupled to the driven wheel 4.

The frame 1 includes a support 12 for placing panels to be sawn thereon. The support 12 is in the shape of a strip, the longitudinal direction of which extends transversely to the longitudinal direction of the frame 1. Panels to be sawn are placed with one edge on the support 12, in other words, panels to be sawn stand upright on the support 12. Therefore a slim support 12 is sufficient and advantageous because of its correspondingly low weight. The support 12 may be pivotably attached 23 to the frame 1 and may be infinitely fixable in different angle positions 24.

Figure 1:
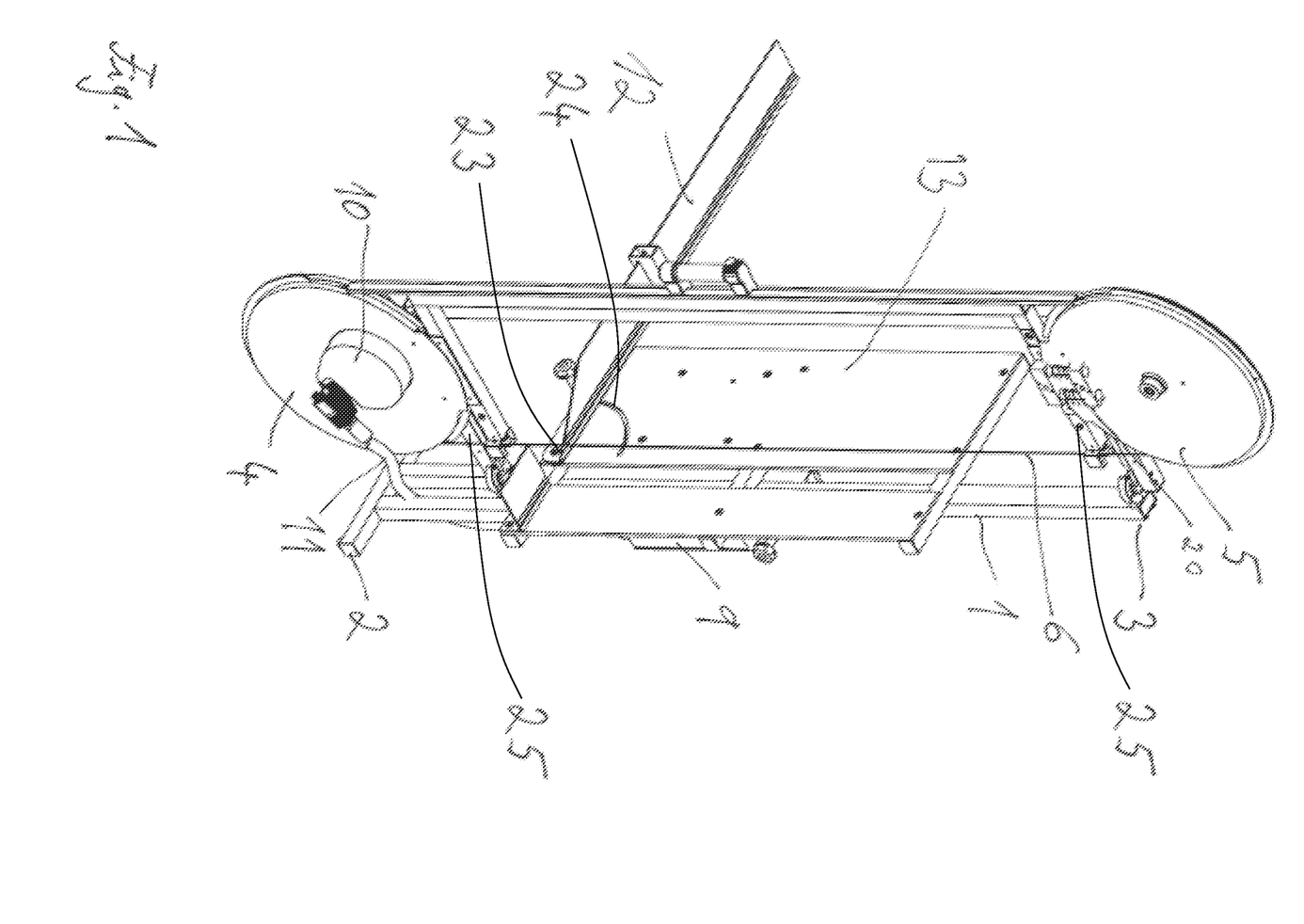
FIG. 1 shows an embodiment of a rope saw according to the invention.
Figure 2:
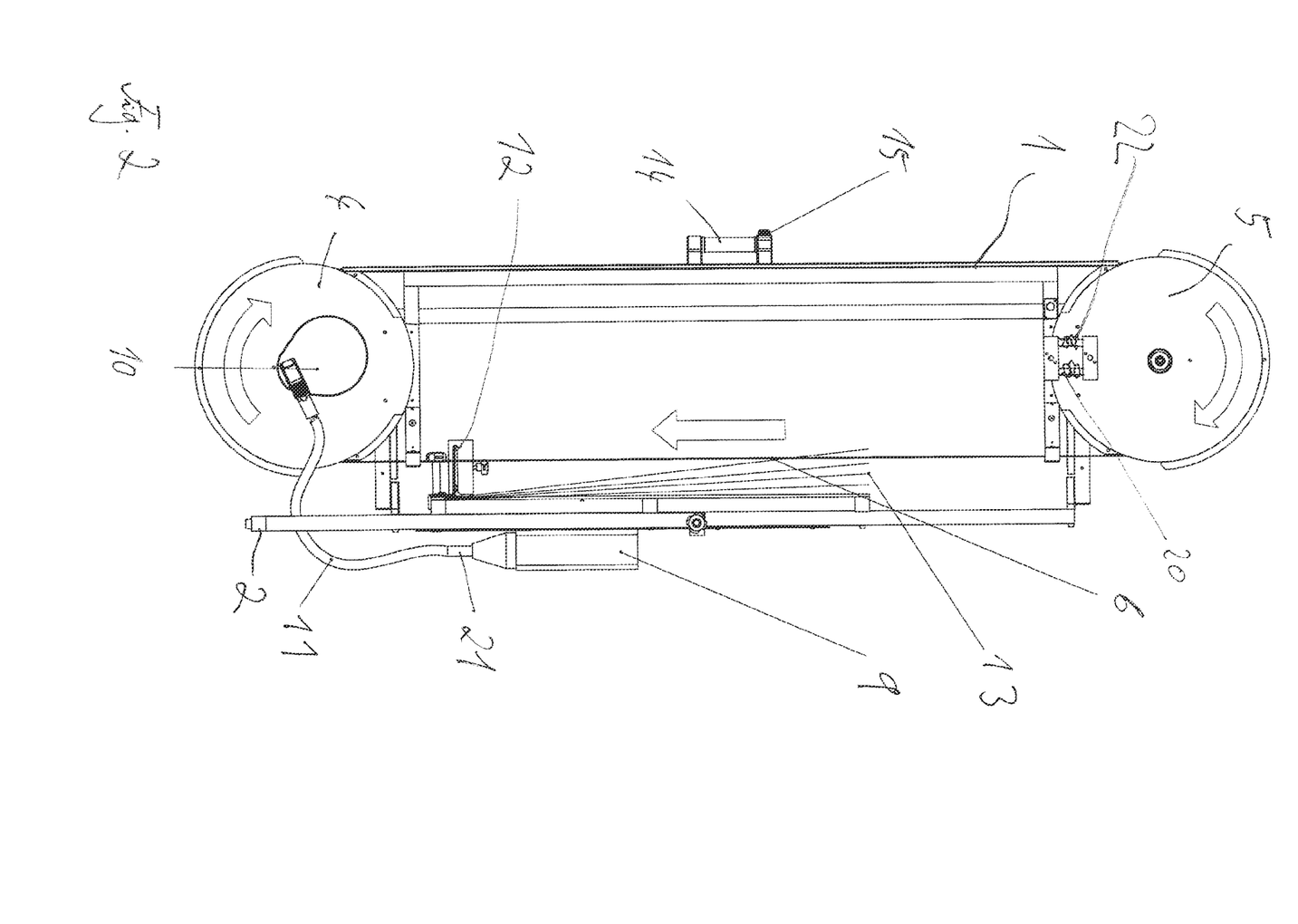
FIG. 2 shows a further view of the rope saw.
Figure 3:
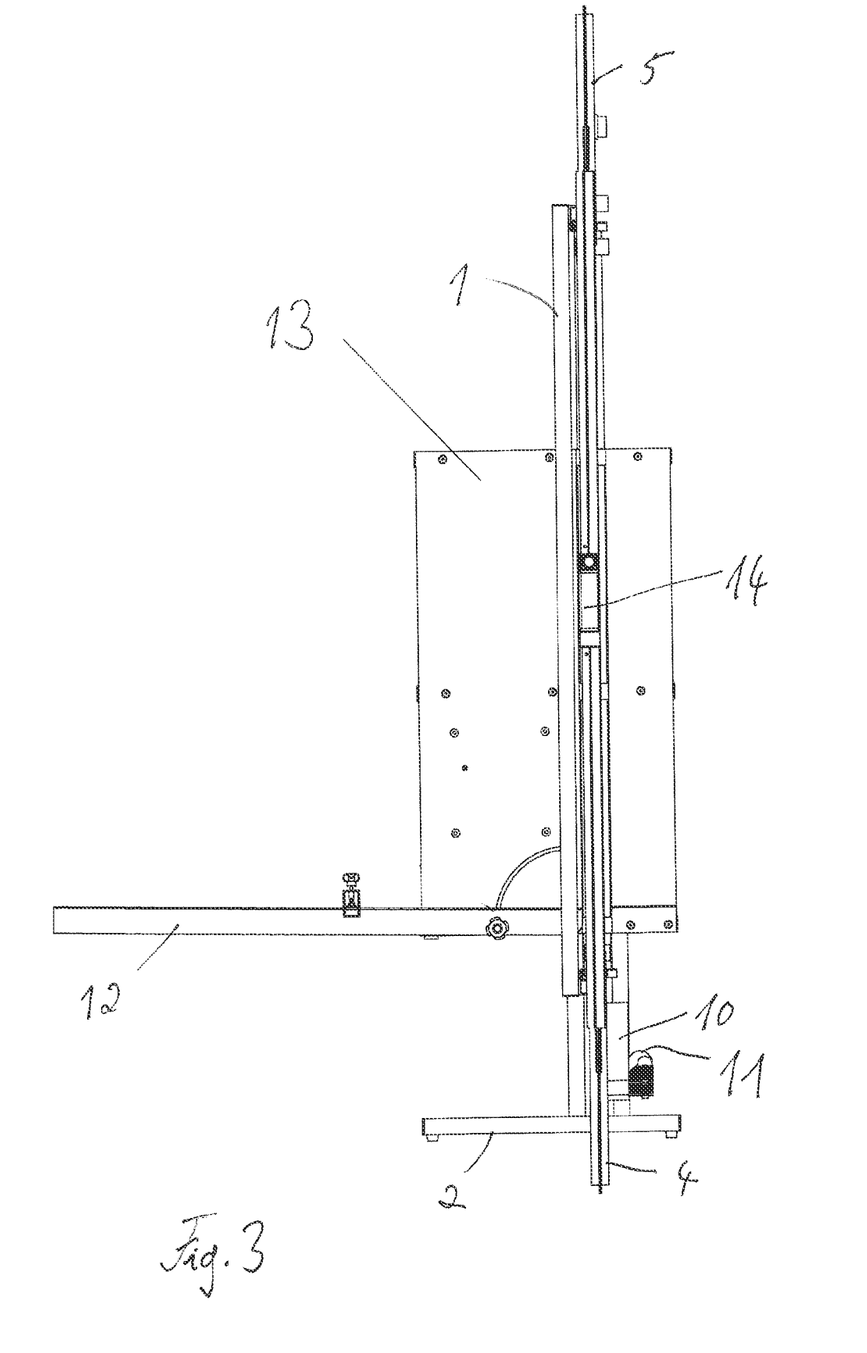
FIG. 3 shows a further view of the rope saw.
Figure 4:
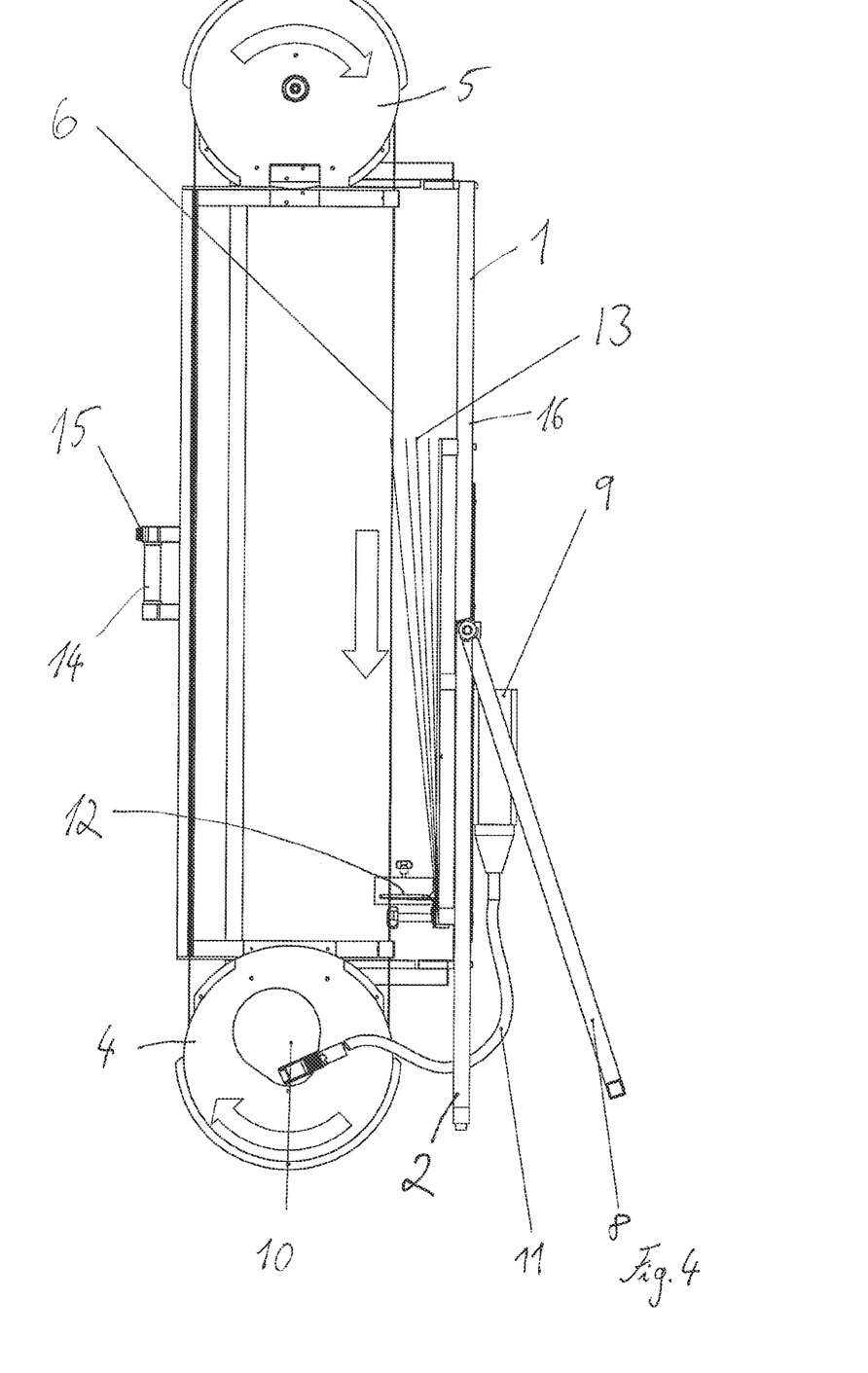
FIG. 4 shows a view of the rope saw according to FIG. 2 with folded-out foot.

A supporting wall 13 attached to the frame 1 is associated with support 12. Panels standing on the support 12 are thus prevented from toppling over by the supporting wall 13. The supporting wall 13 may be pivotably attached to the frame 1. FIG. 4 schematically indicates different angle positions of the supporting wall 13, with which a panel can be cut into a wedge shape.

Figure 5:
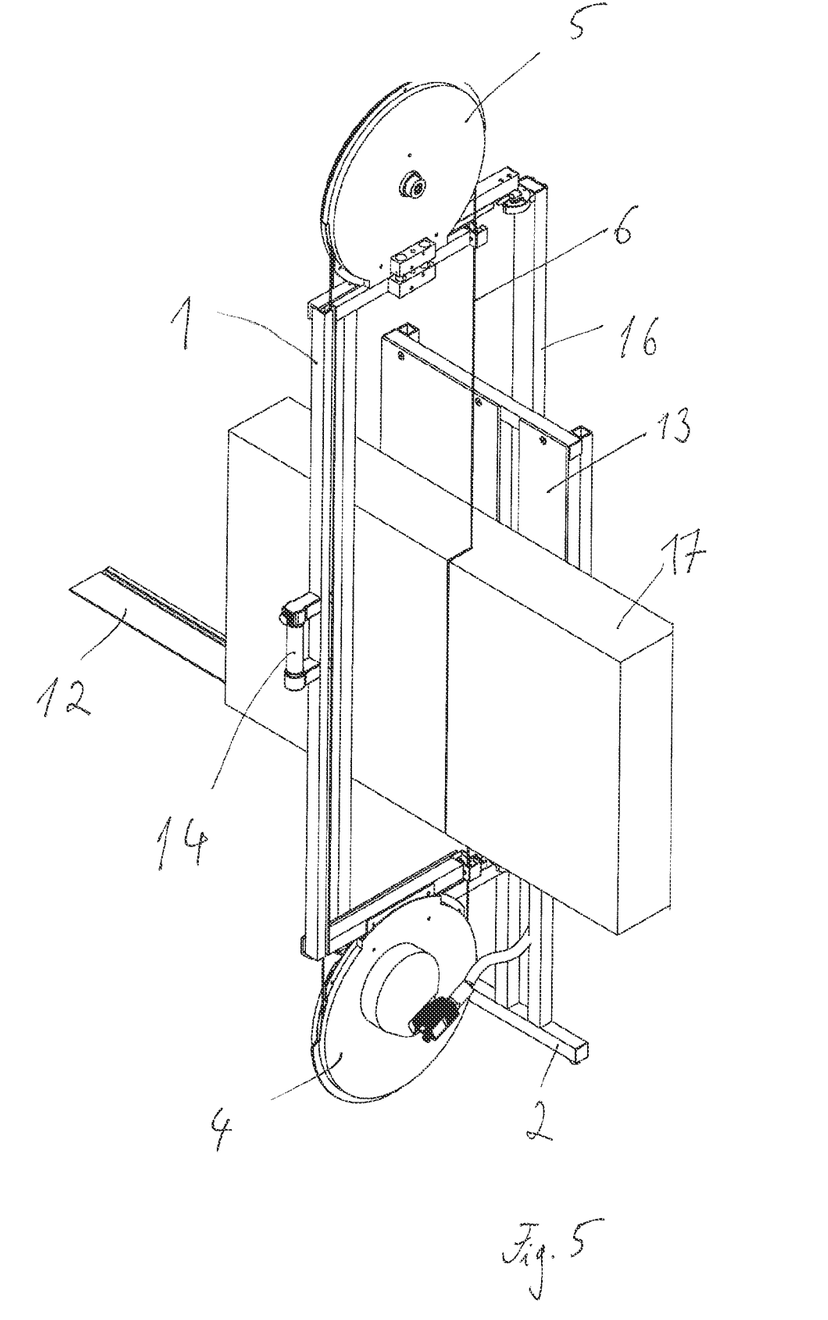
FIG. 5 shows the rope saw with a panel to be sawn.

The support 12 together with the supporting wall 13 is attached to a bracket 16 of the frame 1, which is movable relative to the remaining frame 1 and in particular relative to the wheels 4, 5 transversely to the longitudinal direction of the frame 1, for example by means of a linear guide 25. A panel 17 standing on the support 12 can therefore — as shown in FIG. 5 - be precisely cut. The electric motor 9 is mounted on the movable bracket 16.

The frame 1 has a handgrip 14 attached to it, which may be provided with a button 15 for switching the rope saw on and off.

The two wheels 4, 5 both have a revolving supporting surface made of plastic, on which the saw rope 6 is supported. Polyurethane for example is well suited. If, as is preferred, one or more diamond-studded wires are used as saw rope 6, which may be twisted or intertwined, wear may be reduced in case of a supporting surface made of plastic, in particular polyurethane.

With a saw rope 6 consisting of diamond-studded wire the coating on the wire may chip off due to strong bending. In order to reduce wear therefore the two wheels 4, 5 each have a diameter in the range between 40 and 50 cm.

One of the two wheels 4, 5 is movable relative to the frame 1 in longitudinal direction or the frame 1. In the embodiment shown the non-driven wheel 5 is movable relative to the frame 1. The frame 1 is connected to the wheel 5 movable relative thereto via a linear guide 20, which is realized, for example via pins, which sit in a socket, which is attached to a suspension of the movable wheel 5. These pins may be surrounded by a helical spring 22, the spring force of which pushes the movable wheel 5 away from the frame 1 resulting in an equilibrium of forces between the tension in the saw rope 6 and the spring force.

Figure 6:
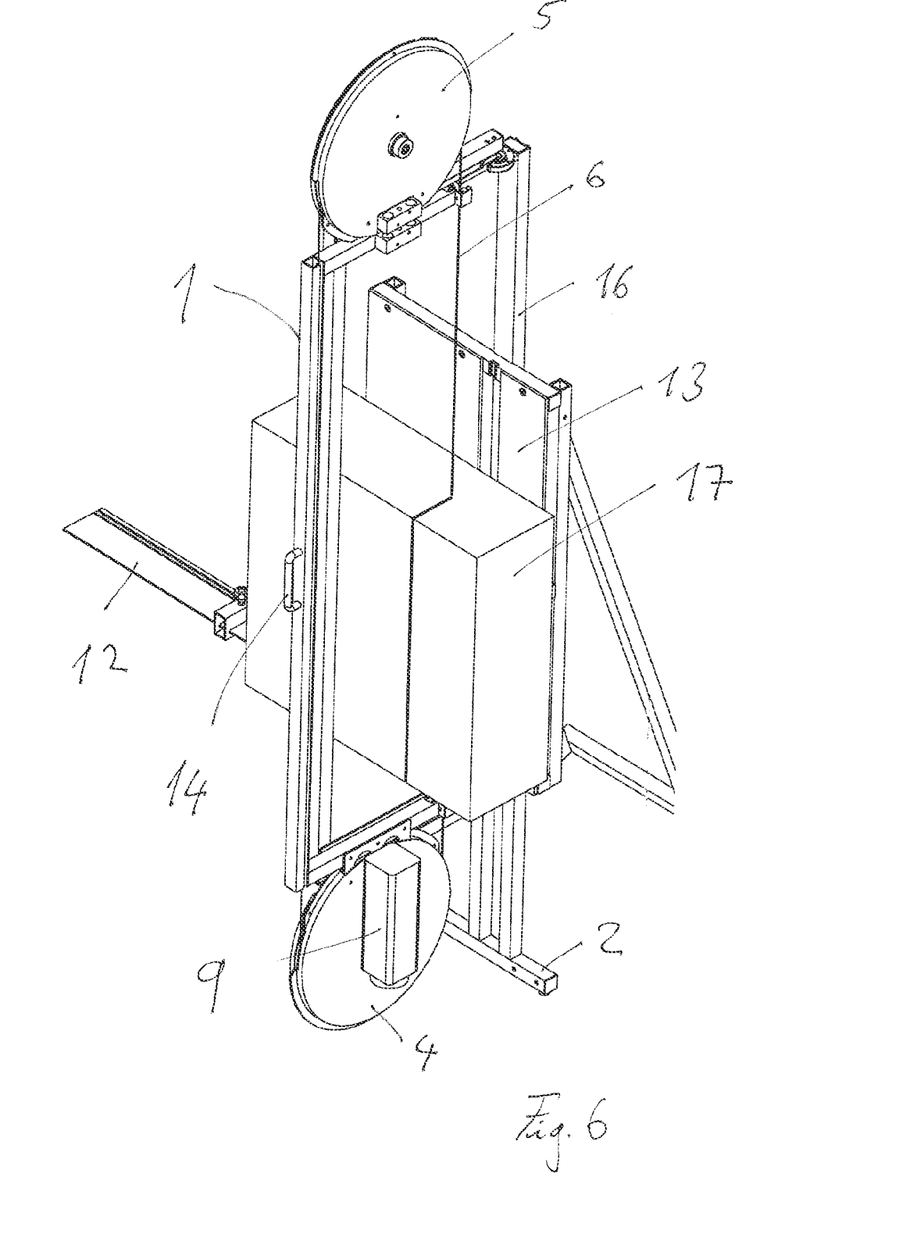
FIG. 6 shows a further embodiment of a rope saw according to the invention.

The rope saw depicted in FIG. 6 differs from the rope saw shown in FIGS. 1 to 5 only in that the electric motor 9 sits on the wheel 4 driven thereby. With the embodiment of FIG. 6 there is therefore no need for a flexible shaft. Instead the electric motor 9 may drive the wheel 4 with a rigid shaft while being retained by the frame 1.

List of reference symbols:
1 frame
2 foot
3 pad
4 wheel
5 wheel
6 saw rope
8 foot
9 electric motor
10 gear unit
11 flexible shaft
12 support
13 supporting wall
14 hand grip
15 button
16 bracket
17 panel
21 motor shaft
22 helical spring
23 pivotably attached
24 angle positions
25 linear guide

What is claimed is:

1. A rope saw for cutting panels to size, comprising:
an elongated frame, which includes a support for placing panels to be sawn thereon, wherein the support is in the shape of a strip;
two wheels connected to a linear guide, where the linear guide is attached to the frame, and where the two wheels are configured for mounting a revolving saw rope, along which extends a longitudinal direction of the frame;
wherein the two wheels and the revolving saw rope via the linear guide are configured to be movable transversely to the longitudinal direction of the frame;
an electric motor attached to the frame configured for driving one of the two wheels;
wherein the support is pivotably attached to the frame; and
a supporting wall configured for supporting the panels standing on the support, wherein the supporting wall is connected to the elongated frame and is disposed perpendicular to the support.

2. The rope saw according to claim 1, wherein the electric motor includes a motor shaft, which extends in the longitudinal direction of the frame and which is coupled to one of the two wheels via a flexible shaft.

3. The rope saw according to claim 2, wherein the flexible shaft is coupled to one of the two wheels via gears.

4. The rope saw according to claim 1, wherein the two wheels for the saw rope both have a revolving support surface made of plastic.

5. The saw rope according to claim 1, wherein the revolving support surface is made of a urethane.

6. The rope saw according to claim 1, wherein the support is fixable in infinitely adjustable angle positions from 0 to 90 degrees.

7. The rope saw according to claim 1, wherein the two wheels both have a diameter of at least 20 cm.

8. The rope saw according to claim 1, wherein the longitudinal direction of the support extends transversely to the longitudinal direction of the frame.

9. The rope saw according to claim 1, wherein the frame includes a fold-out foot.

10. The rope saw according to claim 1, wherein the two wheels protrude in the longitudinal direction of the frame beyond two ends of the frame.

11. The rope saw according to claim 1, wherein one of the two wheels is movable relative to the frame in the longitudinal direction of the frame, and wherein a spring is active between the frame and the wheel movable relative thereto for predefining the saw rope tension with its spring force.

12. The rope saw according to claim 11, wherein the frame and the wheel movable relative thereto are connected to each other via a linear guide.

13. The rope saw according to claim 1, comprising the saw rope tensioned between the two wheels, wherein the saw rope comprises diamond-studded wire.

14. A rope saw for cutting panels, comprising:
an elongated frame, which includes a support for placing panels thereon;
two wheels connected to a linear guide, where the linear guide is attached to the frame, and where along the two wheels extends a longitudinal direction of the frame, said wheels both comprising a plastic surface for mounting a revolving saw rope;
wherein the two wheels and the revolving saw rope via the linear guide are configured to be movable transversely to the longitudinal direction of the frame;
an electric motor attached to the frame configured for driving one of the two wheels;
wherein the support is pivotably attached to the frame and is in the shape of a strip; and
a supporting wall configured for supporting the panels standing on the support, wherein the supporting wall is connected to the elongated frame and is disposed perpendicular to the support.

15. A rope saw for cutting panels, comprising:
an elongated frame, which includes a support for placing panels thereon;
two wheels connected to a linear guide, where the linear guide is attached to the frame, and where the two wheels are configured for mounting a revolving saw rope, along which wheels extends a longitudinal direction of the frame;
wherein the two wheels and the revolving saw rope via the linear guide are configured to be movable transversely to the longitudinal direction of the frame;
an electric motor attached to the frame configured for driving one of the two wheels;
wherein the support is pivotably attached to the frame and the support is in a shape of a strip; and
wherein a supporting wall is attached to the frame configured for supporting a panel that is standing on the support and leaning on the supporting wall, wherein the supporting wall is disposed perpendicular to the support.

* * * * *